United States Patent [19]

Fialla

[11] Patent Number: 5,102,974

[45] Date of Patent: Apr. 7, 1992

[54] FORMED, SINTERED BODY COMPRISING ONE OR MORE AROMATIC POLYESTERS

[75] Inventor: Peter Fialla, Fischer von Erlachgasse, Austria

[73] Assignee: ISONOVA Technische Innovationen Ges.m.b.H., Austria

[21] Appl. No.: 539,082

[22] Filed: Jun. 15, 1990

[30] Foreign Application Priority Data

Feb. 2, 1990 [AT] Austria .................................. 221/90

[51] Int. Cl.⁵ .......................... B27J 5/00; C08J 5/00; C08G 63/02
[52] U.S. Cl. .................... 528/193; 264/126; 264/331.21; 528/176; 528/194
[58] Field of Search ................ 528/176, 193, 194; 264/126, 331.21

[56] References Cited

U.S. PATENT DOCUMENTS

| | | | |
|---|---|---|---|
| 3,846,522 | 11/1974 | Goldman | 264/25 |
| 3,980,749 | 9/1976 | Cottis et al. | 564/331.21 |
| 4,014,965 | 3/1977 | Stube et al. | 264/23 |
| 4,065,519 | 12/1977 | Koch | 264/126 |
| 4,154,918 | 5/1979 | Buxbaum et al. | 528/176 |
| 4,156,069 | 5/1979 | Prevorsek et al. | 528/182 |
| 4,156,774 | 5/1979 | Buxbaum et al. | 528/273 |
| 4,275,188 | 6/1981 | Berger et al. | 528/193 |
| 4,310,652 | 1/1982 | DeBona et al. | 528/125 |
| 4,387,209 | 6/1983 | Rieder et al. | 528/176 |
| 4,388,454 | 6/1983 | Rieder et al. | 528/176 |
| 4,426,511 | 1/1984 | Asada et al. | 528/128 |
| 4,438,053 | 3/1984 | Banke et al. | 264/25 |
| 4,584,335 | 4/1986 | Parker | 525/177 |
| 4,612,350 | 9/1986 | Parker | 525/177 |
| 4,652,608 | 3/1987 | Parker | 525/132 |

*Primary Examiner*—Harold D. Anderson
*Assistant Examiner*—T. Mosley
*Attorney, Agent, or Firm*—Bacon & Thomas

[57] ABSTRACT

Sintered bodies made of aromatic polyesters prepared from diphenols, such as 1,1-bis(4-hydroxyphenyl-1-phenylethane or 9,9-bis(4-hydroxyphenyl)fluorene, and halides of phthalic acid which have one or more glass transition temperatures in the range of 220°–400° C. and tensile strengths higher than 40 N/mm², and advantageously higher than 60 N/mm² are disclosed. To make the sintered bodies, polyester powder is exposed to high pressure within a closed mold and the temperature of the polyester powder is slowly increased by heating until a temperature higher than the glass transition temperature is reached, whereafter the polyester is slowly cooled. During the sintering process the polyester is crosslinked which results in an increased resistance against solvents. The sintered bodies of the invention are used in general as semi-finished products or preformed parts, which will be transformed to bodies with required shapes through subsequent machining.

12 Claims, No Drawings

FORMED, SINTERED BODY COMPRISING ONE OR MORE AROMATIC POLYESTERS

BACKGROUND OF THE INVENTION

1. Field of the Invention

The present invention relates to a formed body comprised of one or more aromatic polyesters derived from diphenols and halides of phthalic acid.

2. Description of the Prior Art

Aromatic polyesters of this kind are known e.g. from the European patent Specifications Nos. 64971 and 64972 and the corresponding U.S. Pat. Nos. 4,387,209 and 4,388,454, the disclosures of which are hereby incorporated by reference. As disclosed in these prior art specifications, the aromatic polyesters are produced in the form of films obtained by means of a casting process from the polyester solution. The polyester described in European Patent Specification No. 64972 and its corresponding U.S. Pat. No. 4,388,454 is a polyester based on 1,1-bis(4-hydroxyphenyl)-1-phenylethane, which is not easy to process by extrusion or injection molding due to its high process temperature in the range of 330°–400° C. The polyester based on 9,9-bis(4-hydroxyphenyl)-fluorene as described in European Patent Specification No. 64971 and its corresponding U.S. Pat. No. 4,387,209 has no melting range at all. It begins to decompose thermally at a temperature of about 400° C.

SUMMARY OF THE INVENTION

The object of the present invention is to provide a formed body comprised of one or more aromatic polyesters derived from diphenols and halides of phthalic acid which, in contrast to films, can be formed into a variety of shapes and forms.

This object is achieved by the formed body according to the invention, which is a sintered body having one or more glass transition temperatures in the range of 220° C.–400° C. and a tensile strength greater than 40 N/mm$^2$, advantageously greater than 60 N/mm$^2$. The polyesters of the invention are advantageously polyesters derived from one or more diphenols of the formula:

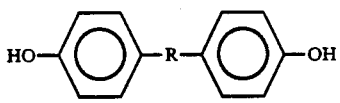

wherein R is a bifunctional hydrocarbon containing at least one aromatic or cycloaliphatic ring.

DETAILED DESCRIPTION OF THE PREFERRED EMBODIMENT

It has been found with the same quality of reactants, the sintered bodies according to the present invention have a higher resistance against solvents, such as carbon tetrachloride, as compared to the films. From this and other facts which will be discussed later on in the specification, it can be concluded that the polyester in the sintered body is crosslinked to certain extent.

According to a preferred embodiment of the invention the sintered body comprises an aromatic polyester derived from 9,9-bis(4-hydroxyphenyl)fluorene.

According to another preferred embodiment of the invention the sintered body comprises an aromatic polyester derived from 1,1-bis(4-hydroxyphenyl)-1-phenylethane.

The sintered bodies produced according to the invention are formed from aromatic polyesters as described the the European Patent Specifications Nos 64972 and 64971 and the corresponding U.S. Pat. Nos. 4,388,484 and 4,387,209, previously referred to, namely:

1. aromatic polyester based on 1,1-bis(4-hydroxyphenyl)-1-phenylethane and phthalic acid dichloride derived from an equimolar mixture of terepnthalic acid and isophthalic acid, hereinafter identified as CPE.

2. aromatic polyester based on 9,9-bis(4-hydroxyphenyl)fluorene and phthalic acid dichloride derived from an equimolar mixture of terephthalic acid and isophthalic acid, hereinafter identified as FPE.

For the production of sintered bodies, polyesters in powder form are used having an average molecular weight of 50,000–1,200,000, approximately corresponding to an inherent viscosity in the range of 0.5–3.8 dl/g (measured as described in the European and U.S. Patent Specifications previously identified). The particle size of the polyester powder is preferably smaller than 600 mm, most preferably between 50–400 mm.

These powder fractions exhibit good sinterability due to their small particle size. However, powders with very fine particle size have a low bulk density which is disadvantageous for sintering. Therefore, the finest powder fraction is not used for sintering in the examples described herein.

In the following the production of sintered bodies of CPE by means of a pressure sintering process will be described in more detail.

EXAMPLE 1

For production of a plate shaped sintered body having dimensions of 200×220×4 mm a mold equipped with heating means is used. The CPE powder which has been previously dried in a vacuum oven at a temperature of 150° C. for several hours is filled in the cavity of the lower-moldhalf. The mold is preheated at a temperature of 150° C. The filling has a bulk density of 0.35 g/cm$^3$. After closing, the mold is brought into the opening of a hydraulic press where the CPE powder is compacted under pressure reaching 5000N/cm$^2$. During this procedure, the mold is heated slowly to increase its temperature, at a rate of about 2° C./min, up to a temperature of 270° C. which is maintained for about 60 min. Thereafter, the mold is cooled down to 230° C. at a rate of about 1° C./min. The pressure is then reduced to a value of about 20 N/cm$^2$. At this pressure, the mold is cooled down to 50° C. The sintered body is then taken out of the mold. The sintered body obtained by this process has a glass transition temperature of 250° C. measured according to ASTM D 3418-82 and a density of 1.21 g/cm$^3$.

EXAMPLE 2

In the same way, a sintered body of FPE powder can be produced. In contrast to the production of the CPE sintered body, the FPE is heated to a temperature of 330° C. and the temperature at which the pressure release is effected is 290° C. The FPE-sintered body produced in this manner has a density of 1.22 g/cm$^3$.

The sintered bodies made of CPE and FPE have an amber like color and are resistant to alcohols, oils and greases.

EXAMPLE 3

As previously stated, polyesters prepared in accordance with the invention are crosslinked during the sintering process, as shown by the following experiment.

From CPE and FPE having molecular weights of about 500,000 a film is cast and a sintered body is produced. After dissolving the film and the sintered body, the polyester of the film has a molecular weight which remains about 500,000, while the molecular weight of the polyester of the sintered body is reduced to a value of 50,000. Due to the lower molecular weight of the sintered polyester compared to the film polyester, the resistance against solvent of the sintered polyester would be expected to be lower than the solvent resistance of the film polyester. However, contrary to this expectation, the sintered polyester shows a higher resistance against solvent as compared to the film polyester. For example, after an immersion in carbon tetrachloride for 90 hours the CPE-film polyester soaks up twice as much solvent as the CPE-sintered polyester. In the case of FPE polyester, the film soaks up nine times the amount of solvent as the sintered polyester.

According to a preferred process for sintering, the mold has no heating means but can be locked under pressure. After filling with the polyester powder (CPE or FPE), the mold is introduced into the opening of a press, where the polyester powder is compacted under a pressure of about 10,000 $N/cm^2$. The mold is locked under pressure, so that after removing the filled mold from the press the pressure remains elevated. Thereafter the mold is heated slowly in an oven to increase its temperature at a rate of about 2° C./min to a temperature of 270° C. (for CPE), 330° C. (for FPE). This temperature is maintained for 60 min for a product having a thickness of about 4 mm. Heating is then stopped and the mold allowed to cool. After reaching a temperature of about 20° C. lower than glass transition temperature of the polyester, the mold is taken out of the oven and continues to cool down to 50° C. At this temperature, the sintered body is removed from the mold.

In producing sintered bodies, it is important that the heating and cooling of the mold proceed slowly. Specific heating and cooling rates depend upon the thickness of the sintered body being produced. As a general rule, the thicker the sintered body, the lower will be the rate of heating and cooling. Similarly, the time for maintaining the polyester at the maximum sintering temperature is dependent upon thickness. Generally, this time should amount to about 15 min per 1 mm thickness of the sintered body.

In the following tables some essential properties of the sintered bodies made from CPE and FPE powders produced in accordance with the invention are given.

1. Mechanical Properties (at room temperature, according to DIN-standrards)

| Property | Unit | CPE max. | FPE max. |
|---|---|---|---|
| Tensile Strength | $N/mm^2$ | 87 | 72 |
| Elongation | % | 9.4 | 4.2 |
| Tensile Modulus | $N/mm^2$ | 2500 | 2800 |
| Flexural Strength | $N/mm^2$ | 125 | 123 |
| Flexural Modulus | $N/mm^2$ | 2550 | 2780 |
| Hardness Rockwell M | | 104 | 117 |
| Shore D | | 88 | 91 |

2. Tribological Properties

Measured with pin-disk-testing apparatus, according to DIN 31680. The disk is of rolling bearing steel with a roughness of Ry = 2 micron.

| | Unit | CPE max. | FPE max. |
|---|---|---|---|
| Coefficient of Friction | $mm^3/Nm$ | 0.8 | 0.8 |
| Abrasion Factor | | $3.5 \times 10^{-6}$ | $19.0 \times 10^{-6}$ |

3. Thermal Properties

| | Unit | CPE max. | FPE max. | Methods |
|---|---|---|---|---|
| Glass Transition Temperature | °C. | 250 | 325 | DSC |
| Heat Deflection Temperature (Method A) | °C. | 217.5 | 307 | TMA |
| Coefficient of Thermal Expansion | $K^{-1}$ | $75 \times 10^{-6}$ | $70 \times 10^{-6}$ | TMA |
| Thermal Conductivity | W/mk | 0.19 | 0.25 | |

4. Electrical Properties

| Property | Unit | Treatment | CPE thickn. (mm) | CPE volume | FPE thickn. (mm) | FPE volume |
|---|---|---|---|---|---|---|
| Dielectric Constant at 1 MHz | | Climate cabinet C48 h/23° C. 50% | | 3.68 | | 4.55 |
| | | keeping under water D24 h/23° C. | | 3.03 | | 4.13 |
| Dissipation Factor at 1 MHz | | Climatic cabinet C48 h/23° C. 50% | | $18.7 \times 10^{-3}$ | | $16.4 \times 10^{-3}$ |
| | | keeping under water D24 h/23° C. | | $23.2 \times 10^{-3}$ | | $17.5 \times 10^{-3}$ |
| Volume Resistivity | Ohm | Climatic cabinet | 3.25 | $2 \times 10^{14}$ | 3.97 | $1 \times 10^{15}$ |

-continued

| at 100 V | C48 h/23° C. 50% | | | |
|---|---|---|---|---|
| 5. Hygroscopic Properties | | | | |
| Properties | Unit | | CPE | FPE |
| Water absorption (keeping under water 24 h/23° C.) | % | | 0.20 | 0.25 |
| Hygroscopic Expansion | 1/% RH | | — | $9.0 \times 10^{-6}$ |
| 6. Burning Properties | | | | |
| | LOI: | | CPE | 33.5 |
| | | | FPE | 40.0 |

Sintered bodies obtained by the processes described herein are, in general, semi-finished products or preformed parts, which will be transformed to bodies with required shapes through subsequent machining.

While the invention has now been described in terms of the preferred embodiments, those of skill in the art will appreciate that various modifications of the products and methods of the invention may be made without departing from the spirit or scope thereof and it is to be understood that the invention is intended to be limited only as defined in the appended claims.

What is claimed is:

1. A formed, sintered body comprising one or more aromatic polyesters exclusively from halides of phthalic acid and one or more diphenols of the formula:

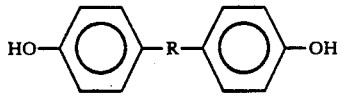

wherein R is a bifunctional hydrocarbon containing at least one aromatic or cycloaliphatic ring, said body having one or more glass transition temperatures in the range of 220° C. –400° C. and a tensile strength greater than 40 N/mm².

2. The body according to claim 1, wherein the tensile strength of the body is greater than 60 N/mm².

3. The body according to claim 1, comprising an aromatic polyester derived from 9,9-bis(4-hydroxyphenyl)-1-phenylethane and having a tensile strength greater than 50 N/mm².

4. The body according to claim 3 wherein the tensile strength is greater than 70 N/mm².

5. The body according to claim 1, comprising an aromatic polyester derived from 9,9-bis(4-hydroxyphenyl) fluorene.

6. A method of preparing a formed sintered body from a powder comprised of one or more aromatic polyesters exclusively derived from halides of phthalic acid and one or more diphenols of the formula:

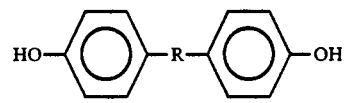

wherein R is a bifunctional hydrocarbon containing at least one aromatic or cycloaliphatic ring, comprising compacting the powder under pressure, heating the compacted powder while it remains under pressure to a temperature above its glass transition temperature and cooling the compacted powder so as to produce a formed, sintered body having one or more glass transition temperatures in the range of 220° C.–400° C. and a tensile strength greater than 40 N/mm².

7. The method according to claim 6, wherein the powder is compacted under a pressure of 5000 N/cm² or greater.

8. The method according to claim 7, wherein the powder is compacted under a pressure of about 10,000 N/cm².

9. The method according to claim 8, wherein said powder is an aromatic polyester formed from 9,9-bis(4-hydroxyphenyl)1-phenylethane.

10. The method according to claim 9, wherein said compacted powder is heated to a temperature of about 270° C.

11. The method according to claim 6, wherein said powder is an aromatic polyester formed from 9,9-bis(4-hydroxyphenyl) fluorene.

12. The method according to claim 11, wherein said compacted powder is heated to a temperature of about 330° C.

* * * * *